United States Patent [19]

Nitta et al.

[11] 4,106,104
[45] Aug. 8, 1978

[54] DATA TRANSFERRING SYSTEM WITH PRIORITY CONTROL AND COMMON BUS

[75] Inventors: Atsushi Nitta, Kawasaki; Hirotoshi Haida, Yokohama, both of Japan

[73] Assignee: Panafacom Limited, Kawasaki, Japan

[21] Appl. No.: 738,959

[22] Filed: Nov. 4, 1976

[30] Foreign Application Priority Data

Nov. 11, 1975 [JP] Japan .............................. 50-135508

[51] Int. Cl.² .......................... G06F 3/04; G06F 9/18; H04Q 3/00; H04Q 5/00
[52] U.S. Cl. .............................. 364/900; 340/147 LP
[58] Field of Search ................................. 340/147 LP

[56] References Cited

U.S. PATENT DOCUMENTS

| | | |
|---|---|---|
| 3,800,287 | 3/1974 | Albright .............................. 364/200 |
| 3,813,651 | 5/1974 | Yamada .............................. 364/200 |
| 3,815,099 | 6/1974 | Cohen et al. ......................... 364/200 |
| 3,832,692 | 8/1974 | Henzel et al. ........................ 364/200 |
| 3,866,181 | 2/1975 | Gayman et al. ...................... 364/200 |
| 3,911,409 | 10/1975 | Kowal et al. ......................... 364/200 |
| 3,983,540 | 9/1976 | Keller et al. ......................... 364/200 |
| 3,993,981 | 11/1976 | Cassarino, Jr. et al. ............. 364/200 |

*Primary Examiner*—Melvin B. Chapnick
*Attorney, Agent, or Firm*—Staas & Halsey

[57] ABSTRACT

A data transferring system having a plurality of devices using a common bus, wherein the devices send out a requesting signal to a requesting signal line for requesting a transfer of data, and in the devices a priority order is assigned to the transference of the data. The system further provides a common control unit for the plurality of devices so as to control the common bus by receiving the requesting signal on the requesting signal line and then sending an acknowledging signal for the transfer of data. Each of the plurality of devices receives the acknowledging signal so that the device which sends out the requesting signal carries out the transfer of data. At least one of the plurality of devices, except for the device having the highest priority order, has a detecting circuit for detecting the requesting signal on the requesting signal line. The device having the detecting circuit detects the requesting signal and prevents the sending out of the requesting signal from its own device and the device which is prevented from sending the requesting signal by the detecting circuit transfers the acknowledging signal to a following device. At least one of the plurality of devices, except for the device having the detecting circuit, is placed on the opposite side of the control unit with respect to the device having the detecting circuit.

1 Claim, 3 Drawing Figures

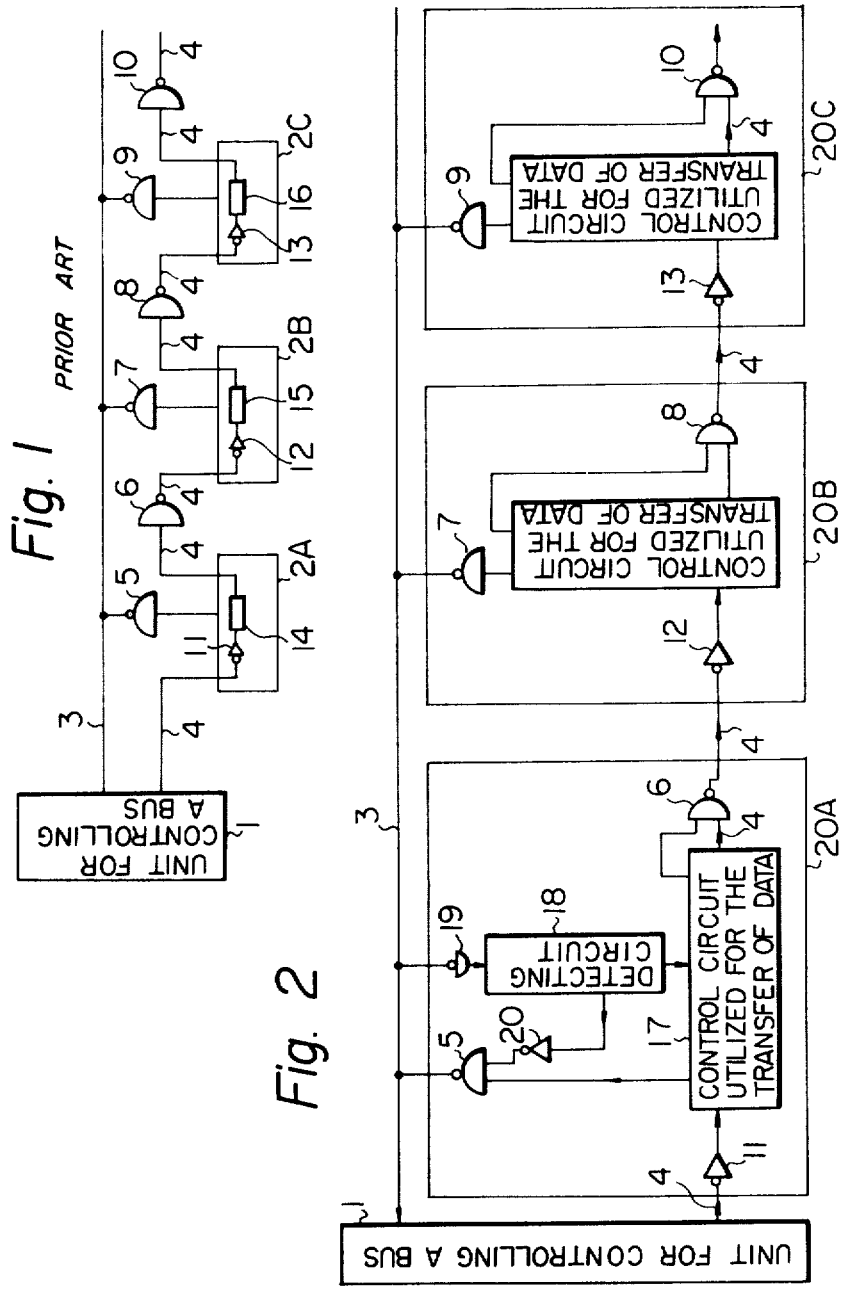

DATA TRANSFERRING SYSTEM WITH PRIORITY CONTROL AND COMMON BUS

BACKGROUND OF THE INVENTION

The present invention relates to a data transferring system, more detailedly, to a data transferring system providing a plurality of devices which uses a bus and which devices are connected in series. The data transferring system in this invention includes, for example, a central processing apparatus, an input-output device, and memory devices which are connected to a common bus line. In this invention, the devices which use the bus correspond to the input-output devices and the memory device mentioned above.

In a data transferring system providing a plurality of devices which use a bus and which are connected in series, each device which uses the bus sends out a signal for requesting a transfer of data, and a unit for controlling the bus commonly provided to the devices which monitor the signal utilized for requesting the transfer of data and consequently sends out a signal for acknowledging the transfer of data to each of said plurality of devices.

In the above-mentioned data transferring system, each device which uses the bus independently sends out a signal for requesting the transfer of data; the unit for controlling the bus to be used detects the signal employed for requesting the transfer of data; and the unit sends out the acknowledging signal for transferring data to each of the devices. In addition, the priority order utilized in the transference of data among the above-mentioned devices is determined such that the device which is nearest to the above-mentioned unit is of the highest priority order. That is, the above-mentioned acknowledging signal for transferring data is sent from unit to one of the devices. When the device is sending out the signal for requesting the transfer of data, the device receives the acknowledging signal; however, the acknowledging signal is not sent to the next device which uses the bus. When the device does not send out a signal for requesting the transfer of data, the device transmits the acknowledging signal to the next device. As mentioned above, the device which has the lowest priority order and which is using the bus is placed at a position farthest from the device for controlling the bus.

Therefore, in the device which has a low priority order and which is frequently used, much time is required for receiving the acknowledging signal for transferring the data from the unit controlling the bus; and thereby the efficiency of the total system is decreased because of the increase in the waiting time.

SUMMARY OF THE INVENTION

An object of the present invention is to provide a data transferring system wherein the device having a low priority order and being used frequently is placed at a position nearer to the unit for controlling the bus so that the above-mentioned waiting time of the device is decreased and the priority order of the device is maintained at a low priority order.

A further object of the present invention is to provide a data transferring system wherein the device which uses the bus detects the signal requesting the transfer of data, which signal is generated from another device during the transfer process of the data, and said former device interrupts said transfer process for transferring the use of the bus to the other device.

For the purpose of achieving the above-mentioned system of the present invention, the data transferring system provides a plurality of devices which use a bus, the devices send out a requesting signal to a requesting signal line for requesting a transfer of data, and in the devices a priority order is assigned to the transference of the data; and a control unit is commonly provided to the plurality of devices so as to control said bus, the control unit receives the request signal on said requesting signal line and then sends an acknowledging signal for the transfer of data, wherein each of the plurality of devices receives the acknowledging signal so that the device which sends out the requesting signal carries out the transfer of data. According to the present invention, at least one of the plurality of devices, except for the device having the highest priority order, comprises a detecting circuit for detecting the requesting signal on the requesting signal line, wherein said device providing said detecting circuit detects the requesting signal so that the device providing said detecting circuit prevents the sending out of the requesting signal from its own device; and at least one of the plurality of the devices, except for the device having the detecting circuit, is placed on the opposite side of the control unit with respect to the device having the detecting circuit.

Further features and advantages of the present invention will be apparent from the ensuing description with reference to the accompanying drawings to which, however, the scope of the invention is in no way limited.

BRIEF DESCRIPTION OF THE DRAWINGS

FIG. 1 is a diagram of the conventional data transferring system providing the devices which use the bus and which are connected in series, FIG. 2 is a diagram of one embodiment of the data transferring system according to the present invention.

DESCRIPTION OF THE PREFERRED EMBODIMENT

Figure 3:
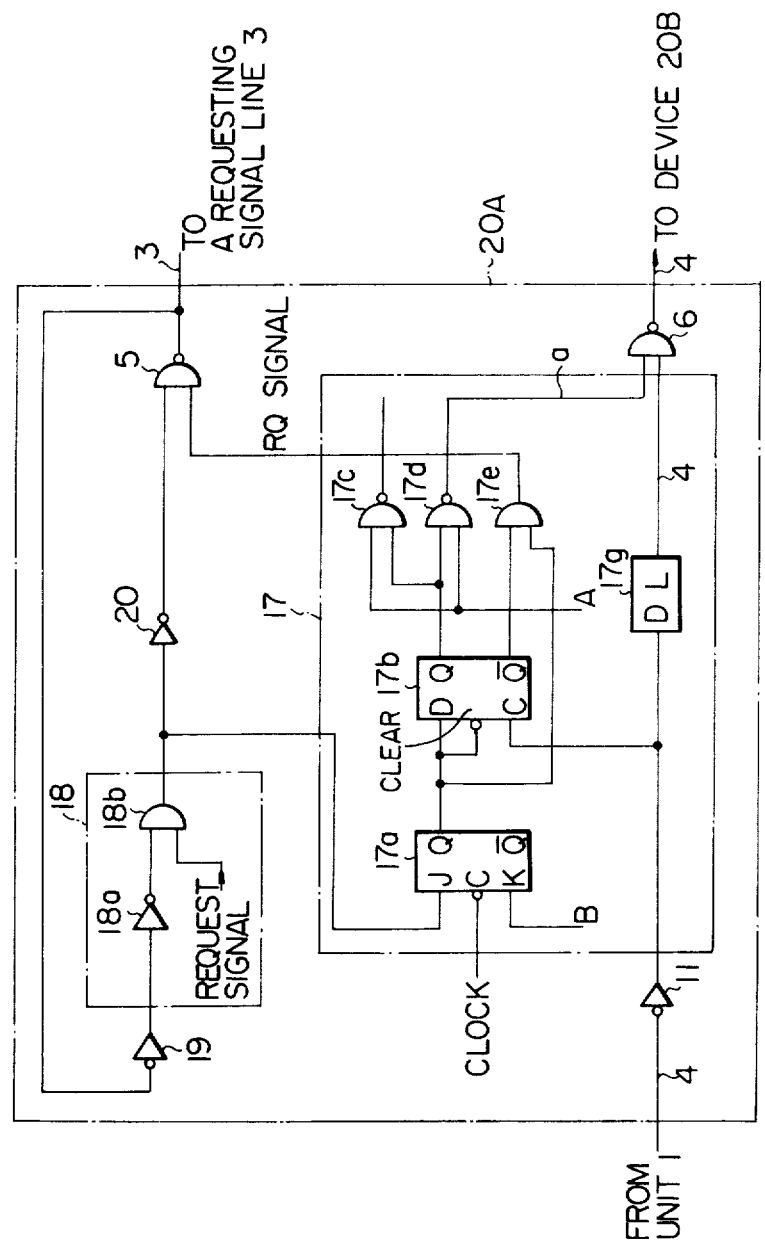
FIG. 3 is a diagram of another embodiment of the present invention.

Referring to FIG. 1, reference numeral 1 indicates a unit for controlling the bus as usually included in the computer system; reference numerals 2A, 2B and 2C are devices which use the bus, such as an input-output unit or a memory device; reference numeral 3 shows a signal line for requesting a transfer of data; reference numerals (4's) show signal lines for acknowledging the transfer of data; reference numerals 5 through 10 are gates; reference numerals 11, 12 and 13 are receivers, and reference numerals 14, 15 and 16 show equivalent delay circuits.

When the devices 2A, 2B and 2C require a transfer of data to a data line (not shown in FIG. 1), said devices 2A, 2B and 2C independently send out a signal, for example, a logical value "0", to request a transfer of data to the signal line 3. The unit 1 always monitors the signal requesting the transfer of data, and when the signal is detected in the signal line 3, unit 1 sends out a signal for acknowledging the transfer of data, for example, a logical value "0", to the signal line 4. The signal acknowledging the transfer of data is inverted by the receiver 11 and then transferred to the device 2A. If the device 2A generates a signal for requesting a transfer of data, then the device 2A will receive a permission signal for acknowledging the transfer of data. However, device 2A does not transfer the acknowledging signal to the next device 2B. Said device 2A sends a logical value 1 to the gate 6 only when device 2A generates no signal for requesting the transfer of data. At which time, gate 6 inverts the logical value "1" to a logical value "0", and the logical value "0" is transferred to the device 2B as a signal for acknowledging the transfer of data.

Therefore, the device which is positioned nearest to unit 1 has the highest priority order. That is, the device which should have the highest priority order is placed nearest to the position of unit 1, for effecting an efficient transmission of the signal for acknowledging the transfer of the data. Therefore, in FIG. 1, when only the device 2C which has the lowest priority order is used, because of the delay time existing in the devices 2A and 2B, a long waiting period is necessary before an acknowledging signal is received by said device 2C. Under this condition, the total efficiency of the system is decreased especially when device 2C is used frequently.

When we make a correspondence between the system shown in FIG. 1 and a data processing system while assuming that the input-output units and the memory device included in the data processing system are connected to a common bus, unit 1 corresponds to the central processing unit, devices 2A and 2B correspond to the input-output units and device 2C corresponds to the memory device. Although the memory device 2C has a lower priority order than that of the input-output units, this device, however, is more frequently used than the input-output units, thus causing the processing rate of the system shown in FIG. 1 to be low.

For overcoming the above-mentioned inconvenience, in the present invention, the memory device having the lowest priority order and being used frequently is placed in the position of the device 2A in FIG. 1 so that the priority order of the memory device is maintained at the lowest priority order and the waiting time of the memory device is decreased.

In FIG. 2 which shows one embodiment of the present invention, the same reference numerals as in FIG. 1 represent the same elements as shown in FIG. 1. Referring to FIG. 2, reference numeral 17 shows a control circuit utilized for the transfer of data, reference numeral 18 shows a detecting circuit for detecting the signal which requests the transfer of data according to the present invention, and reference numerals 19 and 20 show a receiver and a NOT circuit, respectively.

Referring to FIG. 2, the devices 20B and 20C are the same as the devices 2B and 2C used in FIG. 1. Each of the devices 20A, 20B and 20C independently sends out a signal for requesting the transfer of data in the form of a logical value "0" to the signal line 3. This signal is detected by the unit 1, and this unit sends out, in the same way as in the conventional system, a signal for acknowledging said transfer of data to the signal line 4 in the form of a logical value "0".

In the system of the present invention, the device 20A which has the lowest priority order is provided with the detecting circuit 18 utilized for the purpose of detecting the signal for requesting the transfer of the data which may exist in signal line 3. Before device 20A sends out a signal for requesting the transfer of data via the NAND gate 5 to signal line 3, device 20A detects whether or not the other devices 20B or 20C are generating a signal for requesting the transfer of data. If any other device 20B or 20C is generating a signal for requesting the transfer of data, the signal is received by the detecting circuit 18 via the receiver 19 in the form of a logical value "1". Further, by the received signal the output of the NAND gate 5 is made a logical value "1" via the NOT circuit 20 so that the signal for requesting the transfer of data from device 20A is prevented from being sent out. At the same time, the detecting circuit 18 informs the control circuit 17 that the device 20B or 20C is generating a signal for requesting the transfer of data. Therefore, the control circuit 17 receives the signal for acknowledging the transfer of data via the signal line 4, and the output "a" of said control circuit 17 is converted to a logical value "1". Further, the signal for acknowledging the transfer of data, that is, the signal having a logical value "1", is transferred via NAND gate 6 to the next device 20B. In the system shown in FIG. 2, the priority order is maintained with the order of the devices being 20B, 20C, 20A. When only the device 20A is sending out a signal requesting the transfer of data, then the signal for acknowledging the transfer of data is received by device 20A so that the transfer of data can be carried out with the least waiting time, which time is much less than that of the conventional system.

Referring to FIG. 3, the detecting circuit 18, utilized for detecting a signal requesting the transfer of data, is composed of an inverter 18a and an AND gate 18b, and the control circuit 17 is composed of flip flops 17a, 17b, gates 17c, 17d, 17e and a delay circuit 17g.

The characteristic feature of the present invention is to prevent the requesting signal from being sent from its generating device when at least one of the other devices is sending out a requesting signal, and to send the requesting signal from its generating device only when no other devices are sending out any requesting signals. That is:

First, when at least one of the other devices sends out a requesting signal, the signal line 3 is in the logical value "0" condition. Therefore, the output of the receiver 19 has a logicl value "1", and the output of the inverter 18a has a logical value "0". Therefore, the output of the AND gate 18b will always be a logical value "0" whether the requesting signal is being applied to the AND gate 18b or not.

Second, when no other devices are sending out any requesting signals, the signal line 3 is then in the logical value "1" condition. Therefore, the output of the receiver 19 is the logical value "0", and the output of the inverter 18a is the logical value "1". In such case, the device 20A is placed in a condition which can send out the requesting signal, and the requesting signal which is being applied to the AND gate 18b is then sent out from the detecting circuit.

Next, we will explain how the requesting signal is sent out. When the output of the circuit assumes the logical value "1", the flip-flop 17a attains an ON condition and the output Q of the flip-flop 17a then becomes a logical value "1". As the output Q of the flip-flop 17b is a logical value "1", the output of the AND gate 17e therefore becomes the logical value "1". When the flip-flop 17a is placed in an ON condition, the requesting signal which is applied to the AND gate 18b attains the logical value "0" by means of a control circuit which is not shown in the drawing. In such case, the output of the gate circuit 18b has the logical value "0", and the output of the inverter 20 has the logical value "1". Then, the output of the NAND circuit 5 attains the logical value "0", and a requesting signal is sent out.

When the unit 1 sends out a logical value "0" through the signal line 4, the output of the receiver 11 acquires a logical value "1", and the logical value "1" is then supplied to the input C of the flip-flop 17b. In this case, the D-type flip-flop 17b attains an ON condition, because the output Q of the flip-flop 17a has the logical value "1". Consequently, the output Q of the flip-flop acquires a logical value "0", and the output Q of the flip-flop 17b acquires a logical value "1". Therefore, the output of the AND gate 17e assumes the logical value "0", and the output of the NAND circuit 5 assumes the logical value "1".

As the output Q of the flip-flop 17b is a logical value "1", the output of the NAND circuit is a logical value "0".

On the other hand, the signal A is a busy signal which indicates that the bus is being used by the device 20A. This signal A acquires the logical value "0" only when the device 20A is using the bus. Under these circumstances, the output of the NAND circuit 17c then assumes the logical value "1". This means that a signal is sent to the signal line 4 from the unit 1.

After the device 20A has sent the requesting signal and is awaiting the sending of the acknowledging signal from the unit 1 to the signal line 4, the flip-flop 17a is in an ON condition, the flip-flop 17b is in an OFF condition, and the output Q of the flip-flop 17b has the logical value "0". As soon as the acknowledging signal appears on the signal line 4, the output of the receiver acquires a logical value "1", the flip-flop 17b attains an ON condition, thus causing the outputs of the NAND circuits 17c and 17d to respectively become the logical value "0". The signal A is changed to a logical value "0" only after the acknowledging signal has been received. In this case, the signal "a" acquires a logical value "0" and the output of the delay circuit 17g is not transmitted to the next device 20B.

When the output of the NAND gate 17d assumes the logical value "0", this logical value "0" is then transmitted to the unit 1 thereby causing unit 1 to cancel the acknowledging signal. That is, the signal on the signal line 4 assumes the logical value "1", and the output of the receiver 11 assumes the logical value "0". This signal is detected by the device 20A thus causing the signal A to become the logical value "0". Signal A becomes a logical value "0" only after the device 20A has been acknowledged to use the bus. Therefore, the outputs of the NAND gates 17c and 17d respectively acquire the logical value "1", therefore causing the signal "a" to become the logical value "1". Hereinafter, the output signal of the delay circuit 17g is transmitted via the NAND gate 6 to the next device 20B.

After the device 20A has finished using the bus, a signal B is generated in the circuit not shown in the drawing and then the signal is supplied to the input terminal of the flip-flop 17a. Thus, the output Q of the flip-flop 17a becomes zero so that the flip-flop 17b is cleared by the flip-flop 17a at the instant of the falling time of the output Q.

As mentioned above, according to the present invention, a device which has a low priority order, although frequently used as a memory device, can be employed in a series connection without decreasing the efficiency of the total system.

What is claimed is:

1. A data transferring system comprised of a plurality of devices which use a common bus, each of said devices providing a requesting signal to a requesting signal line for requesting a transfer of data, and means associated with said devices for assigning a priority order to the transference of the data; and a control unit commonly provided for said plurality of devices so as to control said common bus, said control unit receiving said requesting signal on said requesting signal line and then sending an acknowledging signal for said transfer of data, each of said plurality of devices receiving said acknowledging signal so that the device which sends out said requesting signal carries out the transfer of data, at least one of said plurality of devices, except for the device having the highest priority order, including a detecting circuit for detecting said requesting signal on said requesting signal line, wherein said device providing said detecting circuit detects said requesting signal so that said device providing said detecting circuit prevents the sending out of said requesting signal from its own device and said device which is prevented from sending out said requesting signal by said detecting circuit transfers said acknowledging signal to a following device; and at least one of said plurality of said devices, except for the device having said detecting circuit, is placed on the opposite side of said control unit with respect to said device having said detecting circuit.

* * * * *

UNITED STATES PATENT AND TRADEMARK OFFICE
CERTIFICATE OF CORRECTION

PATENT NO. : 4,106,104
DATED : August 8, 1978
INVENTOR(S) : Atsushi Nitta et al.

It is certified that error appears in the above—identified patent and that said Letters Patent are hereby corrected as shown below:

Col. 4, line 25, "flip flops" should be --flip-flops--;

Col. 4, line 55, "Q" should be --$\bar{Q}$--;

Col. 5, line 4, "Q" should be --$\bar{Q}$--.

Signed and Sealed this

Thirteenth Day of March 1979

[SEAL]

Attest:

RUTH C. MASON
*Attesting Officer*

DONALD W. BANNER
*Commissioner of Patents and Trademarks*